US012506280B2

(12) United States Patent
Khripkov et al.

(10) Patent No.: US 12,506,280 B2
(45) Date of Patent: Dec. 23, 2025

(54) DUAL-POLARIZATION ANTENNA ELEMENT FOR GENERATION OF MILLIMETER-WAVE FREQUENCY RADIATION

(71) Applicant: HUAWEI TECHNOLOGIES CO., LTD., Guangdong (CN)

(72) Inventors: Alexander Khripkov, Helsinki (FI); Janne Ilvonen, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 18/580,447

(22) PCT Filed: Jul. 22, 2021

(86) PCT No.: PCT/EP2021/070477
§ 371 (c)(1),
(2) Date: Jan. 18, 2024

(87) PCT Pub. No.: WO2023/001375
PCT Pub. Date: Jan. 26, 2023

(65) Prior Publication Data
US 2024/0347932 A1 Oct. 17, 2024

(51) Int. Cl.
*H01Q 21/24* (2006.01)
*H01Q 5/28* (2015.01)
(Continued)

(52) U.S. Cl.
CPC ............... *H01Q 21/24* (2013.01); *H01Q 5/28* (2015.01); *H01Q 5/385* (2015.01); *H01Q 13/085* (2013.01)

(58) Field of Classification Search
CPC .......... H01Q 1/243; H01Q 5/28; H01Q 5/385; H01Q 13/085; H01Q 21/24; H01Q 21/28
See application file for complete search history.

(56) References Cited

U.S. PATENT DOCUMENTS 10,826,162 B1 11/2020 Jeon et al.
2021/0313710 A1* 10/2021 Toprak .................... H01Q 1/38

FOREIGN PATENT DOCUMENTS

WO 2021008690 A1 1/2021
WO 2022199854 A1 9/2022

OTHER PUBLICATIONS

Jin et al., "A Novel Wideband Dual-Pol CPW-fed omega antenna Antenna for Wireless Communication," Proceedings of 2018 International Applied Computational Electromagnetics Society Symposium—China (ACES), Jul. 29, 2018-Aug. 1, 2018, 2 pages.

(Continued)

*Primary Examiner* — Daniel Munoz
(74) *Attorney, Agent, or Firm* — Fish & Richardson P.C.

(57) ABSTRACT

An example dual-polarization antenna element comprises a radiator layer and a resonator layer. The radiator layer comprises a planar antenna radiator, the planar antenna radiator comprising a split ring, enclosing a dielectric area and having ends separated by a first dielectric gap, and two second radiator sections extending from said ends. The resonator layer comprises a center resonator superimposed with said dielectric area and two offset resonator arrangements. Each offset resonator arrangement is at least partially superimposed with one of said second radiator sections, and each offset resonator arrangement comprises at least one sub-resonator. A feed arrangement is at least partially arranged in said radiator layer or in an additional feed layer.

20 Claims, 4 Drawing Sheets

(51) Int. Cl.
*H01Q 5/385* (2015.01)
*H01Q 13/08* (2006.01)

(56) References Cited

OTHER PUBLICATIONS

Wang et al., "Compact dual-polarized antenna combining printed monopole and half-slot antenna for MIMO applications," Proceedings of 2009 IEEE Antennas and Propagation Society International Symposium, Jun. 1-5, 2009, 4 pages.
Li et al., "Dual-polarised monopole-slot co-located MIMO antenna for small-volume terminals," Electronics letters, Nov. 10, 2011, 47(23):1259-1260.
Nie et al., "Structure-Shared Planar UWB MIMO Antenna With High Isolation for Mobile Platform," Proceedings of IEEE Transactions on Antennas and Propagation, Dec. 24, 2018, vol. 67, No. 4, pp. 2735-2738.
International Search Report and Written Opinion in International Appln. No. PCT/EP2021/070477, mailed on Apr. 21, 2022, 13 pages.

* cited by examiner

DUAL-POLARIZATION ANTENNA ELEMENT FOR GENERATION OF MILLIMETER-WAVE FREQUENCY RADIATION

CROSS-REFERENCE TO RELATED APPLICATIONS

This application is a National Stage of International Application No. PCT/EP2021/070477, filed on Jul. 22, 2021, which is hereby incorporated by reference in its entirety.

TECHNICAL FIELD

The disclosure relates to a dual-polarization MIMO (Multiple In Multiple Out) antenna element for generation of millimeter-wave frequency radiation, an antenna arrangement comprising at least one such antenna element, and an electronic apparatus comprising the antenna arrangement.

BACKGROUND

Millimeter-wave bands are considered to have a frequency range of above 10 GHz and up to 300 GHz, and are used in, e.g., point-to-point communications, inter-satellite links, and point-to-multipoint communications. Millimeter-wave bands are also used in various 5G systems.

In order to achieve stable communication in all directions and orientations, an omnicoverage dual-polarized MIMO millimeter-wave antennas maybe used in hand-held devices, such as smartphones. Dual-polarization means that the antenna radiates two polarizations, e.g. vertical polarization and horizontal polarization, in a single direction, such as in an end-fire direction. “Horizontal” may indicate “parallel to the display surface” and “vertical” may indicate “perpendicular to the display surface”.

At the same time, design requirements include the apparatus having a curved design with a sleek metal frame and a large display, with a very small clearance therebetween. The frame should preferably not have any visible openings. These requirements are contradictory to the need for omnicoverage, and thus difficult to achieve in the same apparatus.

In one known solution, having a square cornered, dielectric back cover, the antenna module is positioned more towards the back cover such that the metal frame of the apparatus does not shadow the antenna. This still requires a cut-out to be made in the frame since any parasitic modes generated at high-frequency bands would drastically degrade the radiation performance and, hence, negatively affect the efficiency of the antenna. Furthermore, due to the thickness and required placement of the antenna module, battery size and placement is limited, as there needs to be a relatively long distance of several millimeters between the antenna module and frame.

In a further known solution, dual-band patch arrays are utilized. Dual-band patch arrays do not work well when arranged adjacent to a conductive frame. Dual-band patch arrays arranged with ±45° polarizations face issues including the coupling apertures not working sufficiently well, since those perform best for vertically polarized radiation beams. Furthermore, the reflectors do not work sufficiently well since those perform best for horizontally polarized radiation beams. Additionally, high-band efficiency is degraded due to metal frame reflections. Dual-band patch arrays arranged with polarizations that are parallel and perpendicular to the metal frame, i.e. vertical and horizontal polarizations, face issues including reduced antenna gain for the horizontal polarization and degradation of the high-band efficiency due to electromagnetic field reflections from the metal frame.

Hence, there is a need for a solution that provides good performance and directivity for electronic devices having metal frames and curved displays.

SUMMARY

It is an object to provide an improved dual-polarization MIMO multiband antenna element for generation of millimeter-wave frequency radiation. The foregoing and other objects are achieved by the features of the independent claims. Further implementation forms are apparent from the dependent claims, the description, and the figures.

According to a first aspect, there is provided a dual-polarization antenna element for generation of millimeter-wave frequency radiation, the antenna element comprising a radiator layer comprising a planar antenna radiator configured to generate a radiation field, the radiator layer extending in a first main plane. The planar antenna radiator comprises a first radiator section comprising a split ring having a symmetry axis parallel to the first main plane, ends of the split ring being separated by a first dielectric gap and the split ring enclosing a dielectric area, and two second radiator sections, wherein one of the two second radiator sections extends from each end of the split ring, in the first main plane in directions away from the first dielectric gap. A resonator layer extends in a second main plane parallel with the first main plane, the resonator layer comprising a center resonator and two offset resonator arrangements. The center resonator is superimposed with the dielectric area and sharing symmetry axis with the first radiator section. One of the offset resonator arrangements is at least partially superimposed with one of the second radiator sections, each offset resonator arrangement comprising at least one sub-resonator. A feed arrangement is at least partially arranged in the radiator layer or in an additional feed layer, the feed layer extending in a third main plane parallel with the first main plane and second main plane.

Such a solution allows forming of first polarization multiband electromagnetic radiation as well as second polarization multiband electromagnetic radiation, allowing as much as a 10 dB increase in beamforming gain in the high band. Simultaneously, up to 6 dB increase in efficiency is allowed. Furthermore, the volume and height of the antenna element can be reduced such that it can fit into a smaller region between, e.g., a conductive frame and dielectric cover.

In a possible implementation form of the first aspect, the offset resonator arrangement comprises at least two pairs of sub-resonators, facilitating adaptation of the multiple frequency bands used.

In a further possible implementation form of the first aspect, the sub-resonator comprises a first sub-resonator and a second sub-resonator, the first sub-resonator having a smaller surface area than the second sub-resonator and being separated from the second sub-resonator by a second dielectric gap, facilitating adjustment of the radiation frequencies. The sub-resonators improve both high band and low band performance. The first sub-resonator is configured to radiate second polarization at the high-frequency band, and the second sub-resonator is configured to radiate both first polarization and second polarization at low-frequency bands.

In a further possible implementation form of the first aspect, the second sub-resonator has an irregular shape such that a width of the second sub-resonator decreases as the second sub-resonator extends in a direction away from the first dielectric gap, allowing adaptation of the lowest resonant frequency for both the first polarization and the second polarization.

In a further possible implementation form of the first aspect, pairs of sub-resonators are arranged symmetrically with respect to the symmetry axis, facilitating decoupling of the first polarization and the second polarization, and improving isolation between the feeding ports of the polarizations.

In a further possible implementation form of the first aspect, the first radiator section has a U-shape and the second radiator sections protrude, optionally coaxially, from opposite ends of the U, in opposite directions away from the U, improving the bandwidth and efficiency for the second polarization.

In a further possible implementation form of the first aspect, the antenna radiator is substantially shaped as letter omega Ω, improving the bandwidth and efficiency for the second polarization.

In a further possible implementation form of the first aspect, the antenna element is configured to enable a radiation pattern having a first polarization extending parallel to the symmetry axis and a second polarization extending perpendicular to the symmetry axis, improving millimeter-wave omnicoverage.

In a further possible implementation form of the first aspect, the feed arrangement comprises a common-mode feed configured to excite the first polarization, and a differential-mode feed configured to excite the second polarization, facilitating dual-polarization beamforming and, hence, improving MIMO communication performance.

In a further possible implementation form of the first aspect, the common-mode feed is electromagnetically coupled to the first radiator section at the symmetry axis, and the common-mode feed extends at least partially in a direction perpendicular to the symmetry axis, providing an unbalanced feeding topology for the first polarization beamforming.

In a further possible implementation form of the first aspect, the differential-mode feed is electromagnetically coupled to the second radiator sections, bridging the first dielectric gap. The differential-mode feed extends at least partially in a direction perpendicular to the symmetry axis, providing a stable, balanced feeding topology with improved isolation from the common-mode feed.

In a further possible implementation form of the first aspect, the common-mode feed and the differential-mode feed comprise feed probes extending along a main feed probe axis, each feed probe being galvanically connected to a coupling element extending within the radiator layer and/or the additional feed layer, providing a reliable yet spatially efficient coupling. The common-mode feed and the differential-mode feed are configured to, correspondingly, generate mutually orthogonal electromagnetic radiation of the first polarization and the second polarization.

In a further possible implementation form of the first aspect, the feed probe of the differential-mode feed comprises a plurality of feed probe sections stacked in the direction of the main feed probe axis, at least one of the feed probe sections being offset in at least one direction transverse to the main feed probe axis, providing port isolation between the common-mode feed and the differential-mode feed, therefore enabling mutually orthogonal electromagnetic radiation of the first polarization and the second polarization.

In a further possible implementation form of the first aspect, the differential-mode feed further comprises a ground probe extending along a main ground probe axis and in parallel with the feed probe, the ground probe comprising a plurality of ground probe sections stacked in the direction of the main ground probe axis, at least one of the ground probe sections being offset in at least one direction transverse to the main ground probe axis, providing transformation of the unbalanced feeding line from a radio-frequency integrated circuit. to the balanced differential-mode feed of the second radiator sections of the antenna element.

In a further possible implementation form of the first aspect, the electromagnetic coupling is a capacitive coupling, an inductive coupling, or a combination thereof; facilitating impedance matching for the multiband antenna operation.

According to a second aspect, there is provided an antenna arrangement comprising at least one antenna element according to the above, further comprising a substrate and a conductive element separated by a dielectric spacing, the antenna element being arranged within the dielectric spacing and the feed arrangement of the antenna element being configured to transmit signals to the planar antenna radiator of the antenna element, the dielectric spacing allowing the millimeter-wave frequency radiation to pass therethrough.

In a possible implementation form of the second aspect, the substrate comprises at least one of the radiator layer, the resonator layer, and the additional feed layer of the antenna element, thus using a substrate structure to form part of the antenna arrangement.

In a further possible implementation form of the second aspect, the antenna arrangement further comprises ground walls extending adjacent a periphery of the antenna element, the ground walls extending in the direction perpendicular to the first main plane of the antenna element, the ground walls being used to suppress surface waves and, hence, allow separation, i.e. isolation, of adjacent antenna elements.

In a further possible implementation form of the second aspect, the antenna element is an end-fire antenna element superimposed with or part of the substrate and is configured to generate a radiation field having a main beam direction across the dielectric spacing, facilitating beamforming omnicoverage of the apparatus comprising the antenna arrangement.

In a further possible implementation form of the second aspect, the antenna arrangement is an antenna array comprising a plurality of antenna elements, the antenna elements being aligned in a direction parallel to the first main plane and perpendicular to the main beam direction, providing an as efficient and reliable antenna arrangement as possible, as well as dual-polarization beamforming and beam scanning.

In a further possible implementation form of the second aspect, each planar antenna radiator extends such that the first main plane is at least partially parallel with the conductive element, allowing an arrangement which takes up as little space as possible.

According to a third aspect, there is provided an apparatus comprising a display panel, a back cover, a frame element being arranged at least partially between the display panel and the back cover, and the antenna arrangement according to the above, the frame element being the conductive element of the antenna arrangement, the antenna arrangement being configured to emit radiation having a first polarization and a second polarization and propagating towards and past the frame element Such an apparatus has a highly efficient omnicoverage beamforming. The antenna elements of the antenna arrangement can be arranged relatively close to the conductive elements of the apparatus, freeing up space within the apparatus for, e.g., the battery. Furthermore, the antenna arrangement can be used together with highly curved display panels.

In a possible implementation form of the third aspect, the first polarization radiation has a vertical polarization and the second polarization radiation has a horizontal polarization and is configured to propagate parallel with the main plane of the display panel, facilitating dual-polarization MIMO communication.

In a further possible implementation form of the third aspect, the substrate of the antenna arrangement is a flexible printed circuit board enclosed by the display panel, the back cover, and the frame element. using an existing structure to form part of the antenna arrangement.

In a further possible implementation form of the third aspect, the antenna arrangement is covered by the display panel, the back cover, and the frame element such that it is invisible to the naked eye, allowing radiation to propagate through the apparatus while at least partially protecting the antenna arrangement from the exterior.

These and other aspects will be apparent from the embodiment(s) described below.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figure 1:
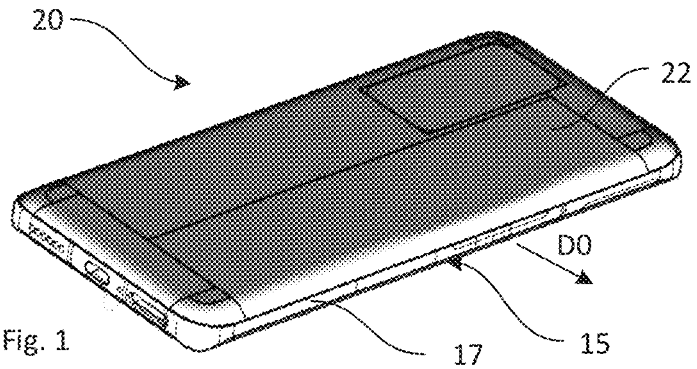
FIG. 1 shows a perspective view of an apparatus in accordance with an example of the embodiments of the disclosure.
Figure 2:
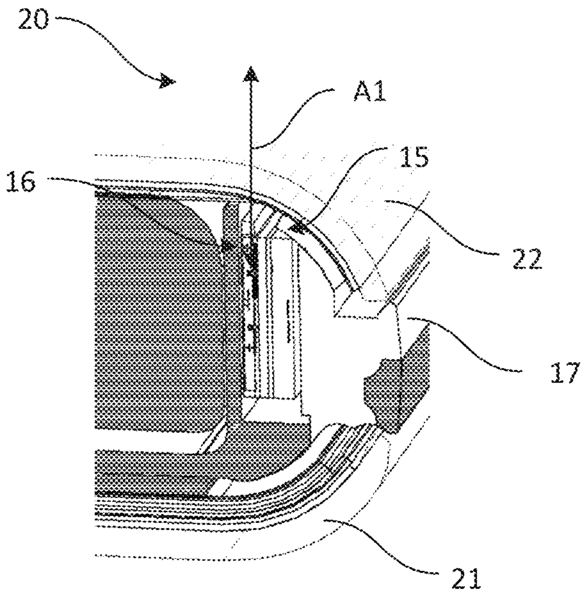
FIG. 2 shows a partial cross-sectional view of an apparatus in accordance with an example of the embodiments of the disclosure.

FIGS. 1 and 2 show an apparatus 20, which according to embodiments of the disclosure maybe a handheld device such as a smartphone or a tablet, comprising a display panel 21, a back cover 22, a frame element being arranged at least partially between the display panel 21 and the back cover 22, and an antenna arrangement 15 described in more detail further below. The frame element may be a metal frame, and the back cover 22 may be a dielectric element made of glass and/or plastic.

Figure 4A:
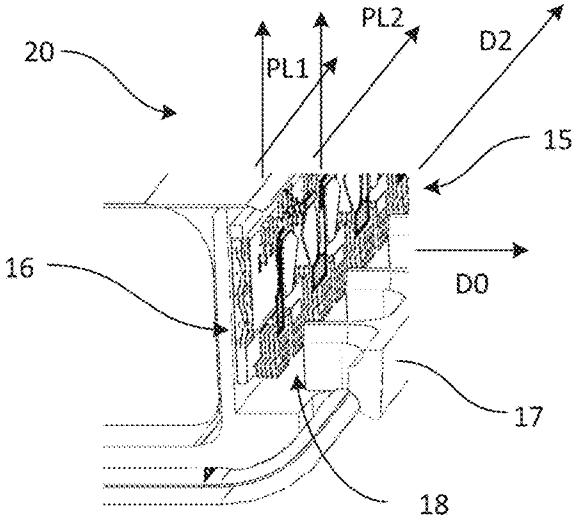
FIG. 4*a* shows a partial cross-sectional view of an antenna arrangement in accordance with an example of the embodiments of the disclosure.
Figure 4B:
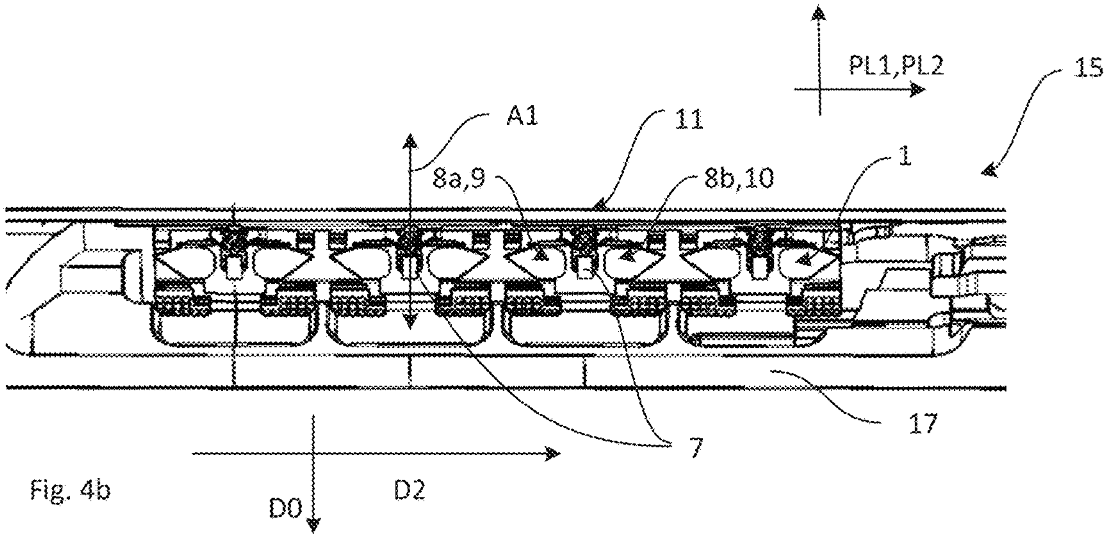
FIG. 4*b* shows a partial perspective view of an antenna arrangement in accordance with an example of the embodiments of the disclosure.

The antenna arrangement 15, as shown in FIGS. 4*a* and 4*b*, comprises at least one antenna element 1, described in more detail further below, a substrate 16, and a conductive element 17 separated by a dielectric spacing 18. The antenna element 1 is arranged within the dielectric spacing 18 and the feed arrangement 11 of antenna element 1 is configured to transmit signals to the planar antenna radiator 2 of the antenna element 1. The conductive element 17 may be the frame element mentioned above.

The antenna element 1 may be configured to operate at multiple frequency bands. The antenna element may be configured to operate at low bands, i.e. the 24-29.5 GHz band, and at high bands, i.e. the 37-43.5 GHz band.

FIGS. 5 and 7 to 9*b* show a dual-polarization antenna element 1 for generation of millimeter-wave frequency radiation, the antenna element 1 comprising a radiator layer 1*a* comprising a planar antenna radiator 2 configured to generate a radiation field, the radiator layer 1*a* extending in a first main plane PL1, the planar antenna radiator 2 comprising a first radiator section 3 comprising a split ring 3*a* having a symmetry axis A1 parallel to the first main plane PL1, ends 3*b*, 3*c* of the split ring 3*a* being separated by a first dielectric gap 5 and the split ring 3*a* enclosing a dielectric area 6, and two second radiator sections 4*a*, 4*b*, wherein one of the two second radiator sections 4*a*, 4*b* extends from each end 3*b*, 3*c* of the split ring 3*a*, in the first main plane PL1 in directions away from the first dielectric gap 5, a resonator layer 1*b* extending in a second main plane PL2 parallel with the first main plane PL1, the resonator layer 1*b* comprising a center resonator 7 and two offset resonator arrangements 8*a*, 8*b*, the center resonator 7 being superimposed with the dielectric area 6 and sharing symmetry axis A1 with the first radiator section 3, one of the offset resonator arrangements 8*a*, 8*b* being at least partially superimposed with one of the second radiator sections 4*a*, 4*b*, each offset resonator arrangement 8*a*, 8*b* comprising at least one sub-resonator 9, 10, a feed arrangement 11 at least partially arranged in the radiator layer 1*a* or in an additional feed layer 1*c*, the feed layer 1*c* extending in a third main plane PL3 parallel with the first main plane PL1 and second main plane PL2. The first main plane PL1, the second main plane PL2, and the third main plane PL3 are shown in FIG. 3.

Figure 3:
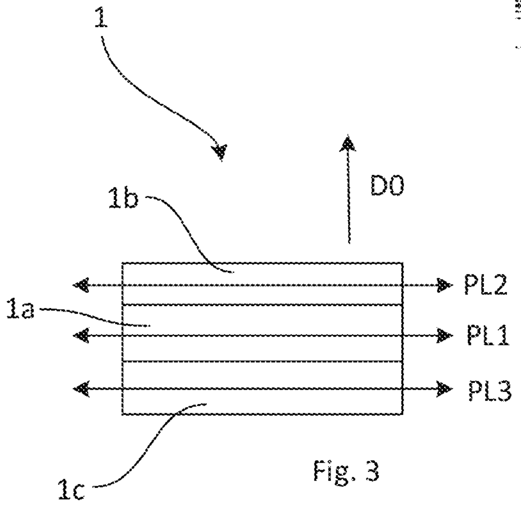
FIG. 3 shows a schematic illustration of the planes of an antenna element in accordance with an example of the embodiments of the disclosure.

The dual-polarization antenna element 1 comprises, as also shown in FIG. 3, a radiator layer 1*a* extending in a first main plane PL1, a resonator layer 1*b* extending in a second main plane PL2 parallel with the first main plane PL1, and, optionally, a feed layer 1*c* extending in a third main plane PL3 parallel with the first main plane PL1 and second main plane PL2.

The radiator layer 1*a* comprises a planar antenna radiator 2 configured to generate a radiation field. The antenna element 1 may be configured to enable a radiation pattern having a first polarization with electric field vectors extending parallel to the symmetry axis A1 and a second polarization with electric field vectors extending perpendicular to the symmetry axis A1.

The planar antenna radiator 2, shown in FIGS. 5 to 10, comprises a first radiator section 3 and two second radiator sections 4*a*, 4*b*.

Figure 6:
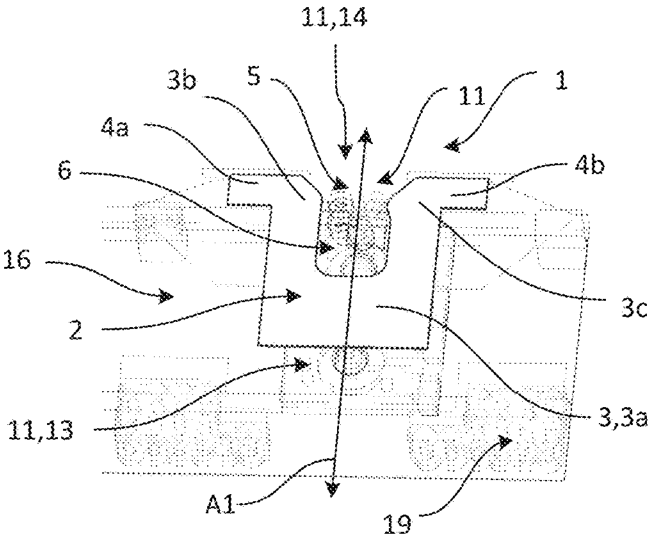
FIG. 6 shows a partial perspective view of an antenna arrangement in accordance with an example of the embodiments of the disclosure.

The first radiator section 3 comprises a split ring 3*a* having symmetry axis A1 parallel to the first main plane PL1, as shown in FIG. 6. The ends 3*b*, 3*c* of the split ring 3*a* are separated by a first dielectric gap 5 and the split ring 3*a* encloses a dielectric area 6. The first radiator section 2 forms an open ring-like shape that defines a slot inside, i.e. dielectric area 6.

One of the two second radiator sections 4*a*, 4*b* extends from each end 3*b*, 3*c* of the split ring 3*a*, in the first main plane PL1 in directions away from the first dielectric gap 5, i.e., the first radiator section 3 and the two second radiator sections 4*a*, 4*b* being one integral component, e.g., made by a sheet material.

The first radiator section 3 may have a U-shape and the second radiator sections 4*a*, 4*b* protrude, optionally coaxially, from opposite ends of the U, in opposite directions away from the U, in other words, the planar antenna radiator 2 may be substantially shaped as letter omega Ω.

The resonator layer 1*b* comprises a center resonator 7 and two offset resonator arrangements 8*a*, 8*b*, as shown in FIGS. 7 to 9*b*.

The center resonator 7 is superimposed with the dielectric area 6 and shares symmetry axis A1 with the first radiator section 3, i.e., the symmetry axis of the center resonator 7 is coaxial with the symmetry axis of the dielectric area 6. The center resonator 7 forms a first polarization slot-coupled element used to tune high band performance, i.e., within the 37-43.5 GHz band, being slot-coupled to the edges of the inside slot formed by the split ring 3*a*.

One of the offset resonator arrangements 8*a*, 8*b* is at least partially superimposed with one of the second radiator sections 4*a*, 4*b*, such that the offset resonator arrangements 8*a*, 8*b* are at least partially aligned with the second radiator sections 4*a*, 4*b* and offset relative the symmetry axis A1 and dielectric area 6. Each offset resonator arrangement 8*a*, 8*b* may comprise at least one sub-resonator 9, 10, optionally at least one pair of sub-resonators 9, 10. The offset resonator arrangement 8*a*, 8*b* may comprise at least one further pair of sub-resonators (not shown). The pairs of sub-resonators 9,10 may be arranged symmetrically with respect to the symmetry axis A1. The offset resonator arrangement 8*a*, 8*b* form edge resonator elements coupled to a second polarization antenna part, i.e. the planar antenna radiator 2, and are used to tune low band performance, i.e. within the 24-29.5 GHz band. The offset resonator arrangements 8*a*, 8*b* are dipole-coupled to the ends 3*b*, 3*c* of the first radiator section 3.

The sub-resonator 9, 10 may comprise a first sub-resonator 9*a*, 10*a* and a second sub-resonator 9*b*, 10*b*, as shown in FIGS. 5 and 7 to 9*b*. The first sub-resonator 9*a*, 10*a* may have a smaller surface area than the second sub-resonator 9*b*, 10*b* and may be separated from the second sub-resonator 9*b*, 10*b* by a second dielectric gap 12. The first sub-resonators 9*a*, 10*a* and the second sub-resonators 9*b*, 10*b* may be considered edge resonators.

Figure 7:
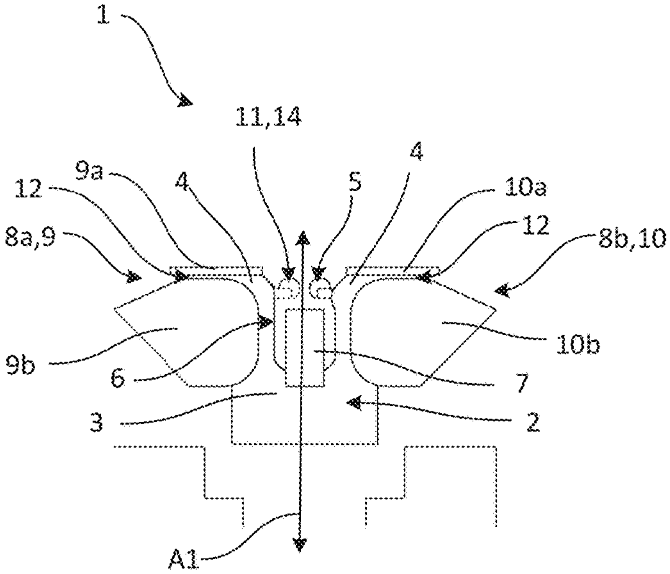
FIG. 7 shows a top view of an antenna element in accordance with an example of the embodiments of the disclosure.
Figure 9A:
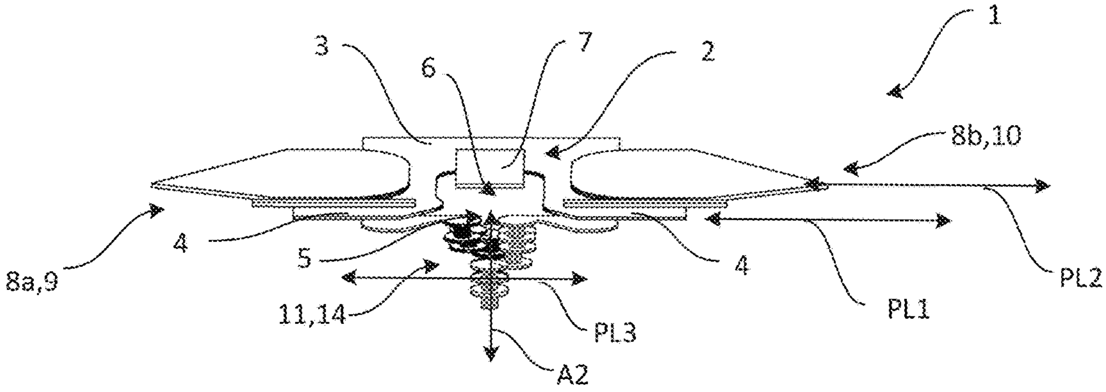
FIG. 9*a* shows a top perspective view of an antenna element in accordance with an example of the embodiments of the disclosure.
Figure 9B:
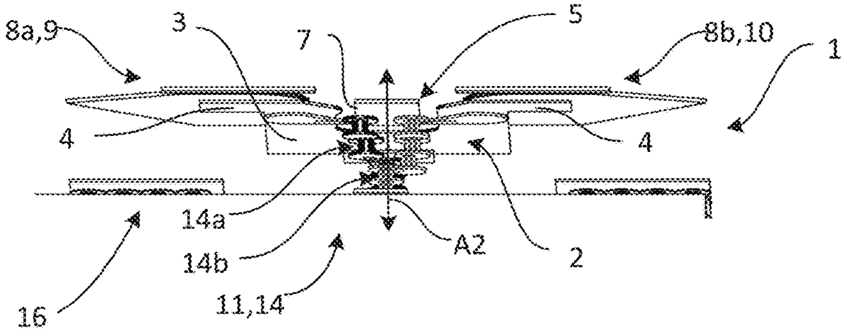
FIG. 9*b* shows a bottom perspective view of the example shown in FIG. 9*a;*

As shown in FIGS. 7 and 9*a* to 9*b*, the second sub-resonator 9*b*, 10*b* may have an irregular shape such that a width of the second sub-resonator 9*b*, 10*b* decreases as the second sub-resonator 9*b*, 10*b* extends in a direction away from the first dielectric gap 5. The shape of the sub-resonators 9*b*, 10*b* can be adapted to define the lowest resonant frequency for the second polarization.

A feed arrangement 11 is at least partially arranged in the radiator layer 1*a* (not shown) or in the feed layer 1*c*.

Figure 8:
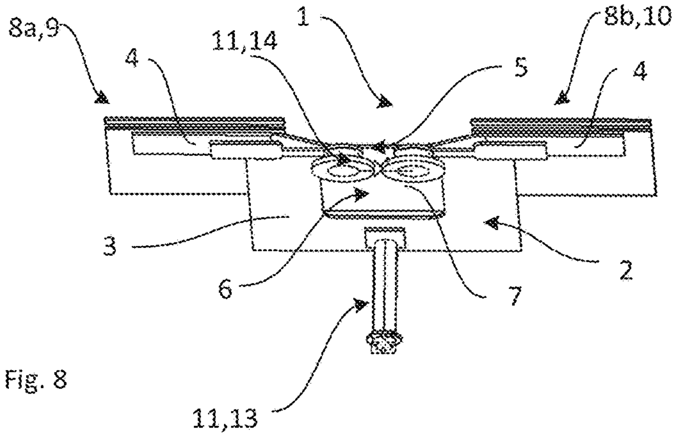
FIG. 8 shows a partial perspective view of an antenna element in accordance with an example of the embodiments of the disclosure.
Figure 10:
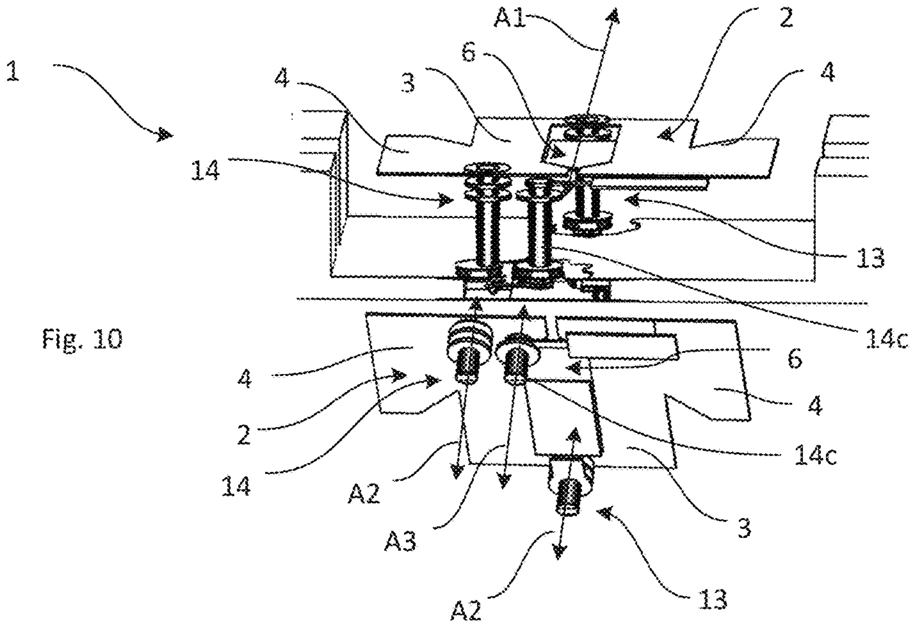
FIG. 10 shows a top and a bottom perspective view of a partial antenna element in accordance with an example of the embodiments of the disclosure.

The feed arrangement 11 may comprise a common-mode feed 13 configured to excite the first polarization, and a differential-mode feed 14 configured to excite the second polarization, as shown in FIGS. 8 to 10.

Figure 5:
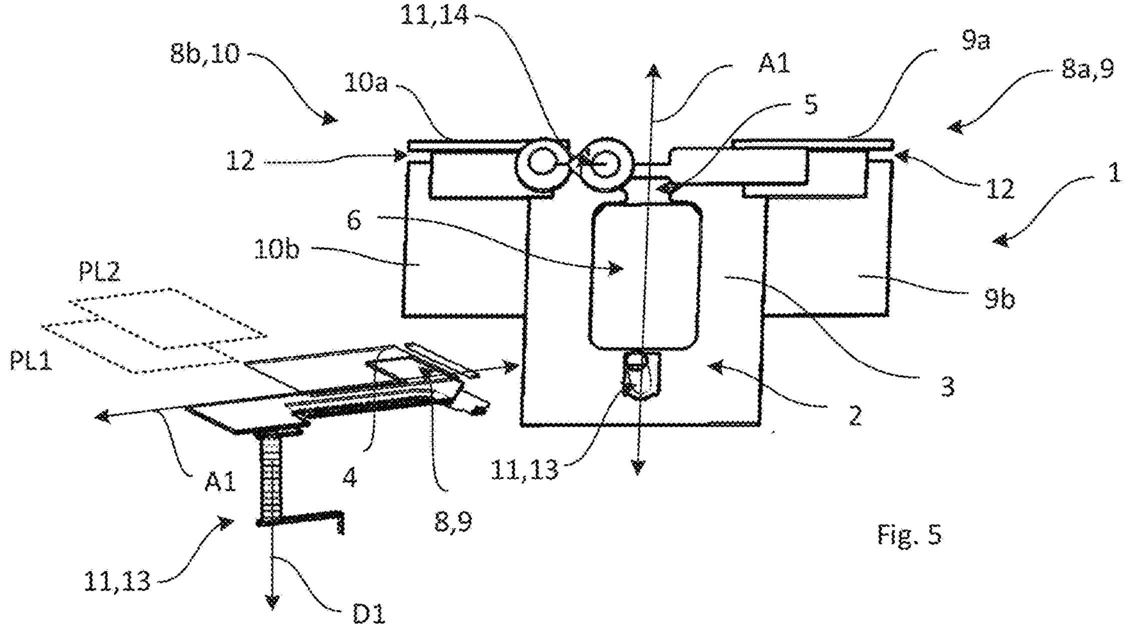
FIG. 5 shows a partial perspective view of an antenna element in accordance with an example of the embodiments of the disclosure.

The common-mode feed 13 may be electromagnetically coupled to the first radiator section 3 at the symmetry axis A1, and the common-mode feed 13 may extend at least partially in a direction D1 perpendicular to the symmetry axis A1 as shown in FIG. 5. The common-mode feed 13 provides an unbalanced feeding topology for the first polarization beamforming. The common-mode feed 13 is used to excite common-mode surface currents on the surface of the first radiator section 3 for the first polarization.

The differential-mode feed 14 may be electromagnetically coupled to the second radiator sections 4*a*, 4*b*, bridging the first dielectric gap 5 as shown in FIGS. 5, 7, and 8. The differential-mode feed 14 may extend at least partially in a direction perpendicular to the symmetry axis A1, providing a stable and balanced feeding topology with improved isolation from the common-mode feed 13. The differential-mode feed 14 is used to excite differential-mode surface currents on the surface of the first radiator section 3 for the second polarization.

The electromagnetic coupling may be a capacitive coupling, an inductive coupling, or a combination thereof.

The common-mode feed 13 and the differential-mode feed 14 may each comprise a feed probe extending along a main feed probe axis A2, as shown in FIGS. 9*a* to 10. The feed probe may be galvanically connected to a coupling element extending within the radiator layer 1*a* and/or the additional feed layer 1*c*.

The feed probe of the differential-mode feed 14 may comprise a plurality of feed probe sections 14*a*, 14*b* stacked in the direction of the main feed probe axis A2, such that at least one of the feed probe sections 14*a*, 14*b* is offset in at least one direction transverse to the main feed probe axis A2 as shown in FIGS. 9*a* and 9*b*.

The differential-mode feed 14 may further comprise a ground probe 14*c* extending along a main ground probe axis A3 and in parallel with the feed probe, as shown in FIG. 10. The ground probe may, similar to the feed probe, comprise a plurality of ground probe sections stacked in the direction of the main ground probe axis A3, such that at least one of the ground probe sections is offset in at least one direction transverse to the main ground probe axis A3.

The sections of the ground probe 14*c* as well as the feed probe sections 14*a*, 14*b* may comprise a balanced twisted-pair feedline, arranged such that it is symmetrical relative to the symmetry axis A1. The twisted-pair feedline may also be arranged such that it is symmetrical relative to the main feed probe axis A2.

As mentioned above, the antenna arrangement 15 comprises at least one antenna element 1 according to the above, substrate 16, and conductive element 17 which are separated by dielectric spacing 18. The antenna element 1 is arranged within the dielectric spacing 18 and the feed arrangement 11 of the antenna element 1 is configured to transmit signals to the planar antenna radiator 2 of the antenna element 1. Each planar antenna radiator 2 may extend such that the first main plane PL1 is at least partially parallel with the conductive element 17.

The substrate 16 may comprise at least one of the radiator layer 1*a*, the resonator layer 1*b*, and the additional feed layer 1*c* of the antenna element 1.

The antenna arrangement 15 may further comprise ground walls 19, as show in FIG. 6, which extend adjacent a periphery of the antenna element 1. The ground walls 19 extend in the direction D1 perpendicular to the first main plane PL1 of the antenna element 1. The ground walls are used to suppress surface waves and provide isolation between adjacent antenna elements.

The antenna element 1 may be an end-fire antenna element 1 superimposed with, or part of, the substrate 16 and may be configured to generate a radiation field having a main beam direction D0 across the dielectric spacing 18, as shown in FIGS. 1 and 4*b*.

The antenna arrangement 15 may be an antenna array comprising a plurality of antenna elements 1, as shown in FIGS. 4*a* and 4*b*, the antenna elements 1 being aligned in a direction D2 parallel to the first main plane PL1 and perpendicular to the main beam direction D0.

The apparatus 20 shown in FIGS. 1 and 2 comprises, as mentioned above, a display panel 21, a back cover 22, a frame element being arranged at least partially between the display panel 21 and the back cover 22, and the antenna arrangement 15 according to the above. The frame element is the conductive element 17 of the antenna arrangement 15. The substrate 16 of the antenna arrangement 15 may be a flexible printed circuit enclosed by the display panel 21, the back cover 22, and the frame element 17. Furthermore, the antenna arrangement 15 may be covered by the display panel 21, the back cover 22, and the frame element 17 such that it is invisible to the naked eye.

The antenna arrangement 15 is configured to emit radiation having a first polarization and a second polarization and propagating towards and past the frame element into free space. The first polarization radiation may have a vertical polarization and the second polarization radiation may have a horizontal polarization and may be configured to propagate parallel with the main plane of the display panel 21.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measured cannot be used to advantage.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms “horizontal”, “vertical”, “left”, “right”, “up” and “down”, as well as adjectival and adverbial derivatives thereof (e.g., “horizontally”, “rightwardly”, “upwardly”, etc.), simply refer to the orientation of the illustrated structure as the particular drawing figure faces the reader. Similarly, the terms “inwardly” and “outwardly” generally refer to the orientation of a surface relative to its axis of elongation, or axis of rotation, as appropriate.

What is claimed is:

1. A dual-polarization antenna element for generation of millimeter-wave frequency radiation, said dual-polarization antenna element comprising:

a radiator layer comprising a planar antenna radiator, said planar antenna radiator configured to generate a radiation field, said radiator layer extending in a first main plane, said planar antenna radiator comprising:

a first radiator section comprising a split ring having a symmetry axis parallel to said first main plane, ends of said split ring being separated by a first dielectric gap and said split ring enclosing a dielectric area; and two second radiator sections, wherein one of the two second radiator sections extends from each end of said split ring, in said first main plane in directions away from said first dielectric gap;

a resonator layer extending in a second main plane parallel with said first main plane, said resonator layer comprising a center resonator and two offset resonator arrangements, said two offset resonator arrangements being separated from each other, said center resonator between said two offset resonator arrangements, said center resonator being superimposed with said dielectric area and sharing said symmetry axis with said first radiator section, one of said two offset resonator arrangements being at least partially superimposed with one of said two second radiator sections, each offset resonator arrangement comprising at least one sub-resonator; and a feed arrangement at least partially arranged in said radiator layer or in an additional feed layer, said additional feed layer extending in a third main plane parallel with said first main plane and second main plane.

2. The dual-polarization antenna element according to claim 1, wherein said at least one sub-resonator comprises a first sub-resonator and a second sub-resonator, said first sub-resonator having a smaller surface area than said second sub-resonator and being separated from said second sub-resonator by a second dielectric gap.

3. The dual-polarization antenna element according to claim 2, wherein said second sub-resonator has an irregular shape, and a width of said second sub-resonator decreases as said second sub-resonator extends in a direction away from said first dielectric gap.

4. The dual-polarization antenna element according to claim 1, wherein said dual-polarization antenna element is configured to enable a radiation pattern having a first polarization extending parallel to said symmetry axis and a second polarization extending perpendicular to said symmetry axis.

5. The dual-polarization antenna element according to claim 4, wherein said feed arrangement comprises a common-mode feed configured to excite said first polarization, and a differential-mode feed configured to excite said second polarization.

6. The dual-polarization antenna element according to claim 5, wherein said common-mode feed is electromagnetically coupled to said first radiator section at said symmetry axis, and said common-mode feed extends at least partially in a direction perpendicular to said symmetry axis.

7. The dual-polarization antenna element according to claim 5, wherein said differential-mode feed is electromagnetically coupled to said second radiator sections, said differential-mode feed bridging said first dielectric gap.

8. The dual-polarization antenna element according to claim 5, wherein said common-mode feed and said differential-mode feed comprise a feed probe extending along a main feed probe axis, said feed probe being galvanically connected to a coupling element extending within at least one of said radiator layer or said additional feed layer.

9. The dual-polarization antenna element according to claim 8, wherein said feed probe of said differential-mode feed comprises a plurality of feed probe sections stacked in a direction of said main feed probe axis, at least one of said feed probe sections being offset in at least one direction transverse to said main feed probe axis.

10. The dual-polarization antenna element according to claim 9, wherein said differential-mode feed further comprises a ground probe extending along a main ground probe axis and in parallel with said feed probe, said ground probe comprising a plurality of ground probe sections stacked in a direction of said main ground probe axis, at least one of said ground probe sections being offset in at least one direction transverse to said main ground probe axis.

11. An antenna arrangement comprising an antenna element, said antenna element comprising:

a radiator layer comprising a planar antenna radiator, said planar antenna radiator configured to generate a radiation field, said radiator layer extending in a first main plane, said planar antenna radiator comprising:

a first radiator section comprising a split ring having a symmetry axis parallel to said first main plane, ends of said split ring being separated by a first dielectric gap and said split ring enclosing a dielectric area; and two second radiator sections, wherein one of the two second radiator sections extends from each end of said split ring, in said first main plane in directions away from said first dielectric gap;

a resonator layer extending in a second main plane parallel with said first main plane, said resonator layer comprising a center resonator and two offset resonator arrangements, said two offset resonator arrangements being separated from each other, said center resonator between said two offset resonator arrangements, said center resonator being superimposed with said dielectric area and sharing said symmetry axis with said first radiator section, one of said two offset resonator arrangements being at least partially superimposed with one of said two second radiator sections, each offset resonator arrangement comprising at least one sub-resonator;

a feed arrangement at least partially arranged in said radiator layer or in an additional feed layer, said additional feed layer extending in a third main plane parallel with said first main plane and second main plane; and a substrate and a conductive element separated by a dielectric spacing, said antenna element being arranged within said dielectric spacing, and said feed arrangement being configured to transmit signals to said planar antenna radiator.

12. The antenna arrangement according to claim 11, wherein said antenna arrangement further comprises ground walls extending adjacent a periphery of said antenna element, said ground walls extending in a direction perpendicular to the first main plane of said antenna element.

13. The antenna arrangement according to claim 11, wherein said antenna element is an end-fire antenna element superimposed with or part of said substrate and is configured to generate a radiation field having a main beam direction across said dielectric spacing.

14. The antenna arrangement according to claim 13, wherein said antenna arrangement is an antenna array comprising a plurality of antenna elements, said plurality of antenna elements being aligned in a direction parallel to said first main plane and perpendicular to said main beam direction.

15. An apparatus comprising:

a display panel, a back cover, a frame element being arranged at least partially between said display panel and said back cover, and an antenna arrangement, said antenna arrangement comprising an antenna element, a substrate, and a conductive element, said substrate and said conductive element being separated by a dielectric spacing, said antenna element comprising:

a radiator layer comprising a planar antenna radiator, said planar antenna radiator configured to generate a radiation field, said radiator layer extending in a first main plane, said planar antenna radiator comprising:

a first radiator section comprising a split ring having a symmetry axis parallel to said first main plane, ends of said split ring being separated by a first dielectric gap and said split ring enclosing a dielectric area; and two second radiator sections, wherein one of the two second radiator sections extends from each end of said split ring, in said first main plane in directions away from said first dielectric gap;

a resonator layer extending in a second main plane parallel with said first main plane, said resonator layer comprising a center resonator and two offset resonator arrangements, said two offset resonator arrangements being separated from each other, said center resonator between said two offset resonator arrangements, said center resonator being superimposed with said dielectric area and sharing said symmetry axis with said first radiator section, one of said two offset resonator arrangements being at least partially superimposed with one of said two second radiator sections, each offset resonator arrangement comprising at least one sub-resonator; and a feed arrangement at least partially arranged in said radiator layer or in an additional feed layer, said additional feed layer extending in a third main plane parallel with said first main plane and second main plane;

said antenna element being arranged within said dielectric spacing, and said feed arrangement being configured to transmit signals to said planar antenna radiator;

said frame element being said conductive element; and said antenna arrangement being configured to emit radiation having a first polarization and a second polarization and propagating towards and past said frame element.

16. The apparatus according to claim 15, wherein said substrate is a flexible printed circuit enclosed by said display panel, said back cover, and said frame element.

17. The antenna arrangement according to claim 11, wherein said at least one sub-resonator comprises a first sub-resonator and a second sub-resonator, said first sub-resonator having a smaller surface area than said second sub-resonator and being separated from said second sub-resonator by a second dielectric gap.

18. The antenna arrangement according to claim 17, wherein said second sub-resonator has an irregular shape, and a width of said second sub-resonator decreases as said second sub-resonator extends in a direction away from said first dielectric gap.

19. The apparatus according to claim 15, wherein said at least one sub-resonator comprises a first sub-resonator and a second sub-resonator, said first sub-resonator having a smaller surface area than said second sub-resonator and being separated from said second sub-resonator by a second dielectric gap.

20. The apparatus according to claim 19, wherein said second sub-resonator has an irregular shape, and a width of said second sub-resonator decreases as said second sub-resonator extends in a direction away from said first dielectric gap.

* * * * *